(12) United States Patent
Matityahu et al.

(10) Patent No.: US 7,599,301 B2
(45) Date of Patent: Oct. 6, 2009

(54) COMMUNICATIONS NETWORK TAP WITH HEARTBEAT MONITOR

(75) Inventors: Eldad Matityahu, Palo Alto, CA (US); Robert E. Shaw, Los Gatos, CA (US); Stephen H. Strong, Fremont, CA (US)

(73) Assignee: Net Optics, Inc., Santa Clara, CA (US)

( * ) Notice: Subject to any disclaimer, the term of this patent is extended or adjusted under 35 U.S.C. 154(b) by 717 days.

(21) Appl. No.: 11/174,238

(22) Filed: Jul. 1, 2005

(65) Prior Publication Data

US 2007/0002755 A1    Jan. 4, 2007

(51) Int. Cl.
- *H04J 3/14* (2006.01)
- *G06F 11/00* (2006.01)
- *G08C 25/00* (2006.01)

(52) U.S. Cl. .............. 370/242; 370/248; 714/48; 714/703; 714/799; 714/715

(58) Field of Classification Search ......... 370/216–228, 370/242–246, 248–249
See application file for complete search history.

(56) References Cited

U.S. PATENT DOCUMENTS

| | | | | |
|---|---|---|---|---|
| 6,047,321 | A * | 4/2000 | Raab et al. | 709/224 |
| 6,424,627 | B1 * | 7/2002 | Sørhaug et al. | 370/241 |
| 6,687,847 | B1 | 2/2004 | Aguilera et al. | |
| 6,714,976 | B1 | 3/2004 | Wilson et al. | |
| 6,798,740 | B1 * | 9/2004 | Senevirathne et al. | 370/219 |
| 7,486,625 | B2 * | 2/2009 | Matityahu et al. | 370/242 |
| 2002/0032880 | A1 | 3/2002 | Poletto et al. | |
| 2004/0120259 | A1 * | 6/2004 | Jones et al. | 370/250 |

(Continued)

FOREIGN PATENT DOCUMENTS

WO    WO 02/19642    3/2002

(Continued)

OTHER PUBLICATIONS

International (PCT) Search Report mailed Dec. 6, 2006 re PCT/US06/25437.

(Continued)

*Primary Examiner*—Chi H Pham
*Assistant Examiner*—Ahmed Elallam
(74) *Attorney, Agent, or Firm*—IP Strategy Group, P.C.

(57) ABSTRACT

A communications network tap, comprises a first terminal and a second terminal adapted to couple the tap in-line in the network and communicate data packets with network devices. A heartbeat generator is configured to generate a heartbeat signal, and a heartbeat insert circuit coupled to the first terminal and the heartbeat generator and configured to insert the heartbeat signal into data packets. A third terminal is coupled to the heartbeat insert circuit and adapted to couple the tap to a network monitor and communicate data packets with network monitor. A heartbeat remove circuit is coupled to the third terminal and configured to receive data packets from a network monitor and remove the heartbeat signal from the data packets. A heartbeat detector coupled to the heartbeat remove circuit and configured to detect whether the data packets include the heartbeat signal, and if not, to generate an alarm signal. A switch is coupled to the second terminal and configured to transmit data packets onto the network. Advantages of the invention include ensuring the integrity of network monitoring equipment.

20 Claims, 3 Drawing Sheets

U.S. PATENT DOCUMENTS

2004/0243702 A1* 12/2004 Vainio et al. ............... 709/224
2005/0122910 A1   6/2005 Parupudi et al.
2005/0129033 A1*  6/2005 Gordy et al. ............... 370/401

FOREIGN PATENT DOCUMENTS

WO    WO 2004/012163      2/2004

OTHER PUBLICATIONS

Written Opinion mailed Dec. 6, 2006 re PCT/US06/25437.
"International Preliminary Report on Patentability", Issued in PCT Application No. PCT/US2006/025437; Mailing Date: Jan. 17, 2008.
"Belkin Quick Installation Guide", N1 Vision Wireless Router, Belkin International, Inc., no date, 3 pages total.
"Network Status Display", Belkin International, Inc., 2007, 1 page total.

* cited by examiner

COMMUNICATIONS NETWORK TAP WITH HEARTBEAT MONITOR

FIELD

The present invention relates to a communications network tap with a heartbeat monitor.

BACKGROUND

Telecommunications networks are important for providing global data and voice communication. Monitoring the networks is important to ensure reliable operation, fault detection, timely mitigation of potentially malicious activities and more. Network taps are known for connecting to networks and providing a port to monitor the communication traffic on the network. Network monitors are known for providing information to other network elements.

In order to maintain the integrity of network monitors, it is important to implement a fault detection technique where certain network components can signal an alarm in the event of a fault in another component. This is important because a faulty component may not provide a reliable alarm signal, for example, if the power supply fails and the component is without power to provide the alarm.

Conventional network taps provide an alarm signal in the event of power failure in monitoring equipment. While this may be a common occurrence, it is not the only occurrence that can lead to a fault. What is needed is a network tap that can provide additional integrity verification of network monitoring components.

SUMMARY

The present invention provides an improved network tap that includes a heartbeat monitor for ensuring the integrity of a network monitor and network traffic. The invention inserts a heartbeat signal into the network traffic prior to a network monitor and then verifies for the heartbeat signal prior to returning the data traffic back into the communication network.

An exemplary embodiment of a communications network tap comprises a first terminal and a second terminal adapted to couple the tap in-line in the network and communicate data packets with network devices. A heartbeat generator is configured to generate a heartbeat signal, and a heartbeat insert circuit coupled to the first terminal and the heartbeat generator and configured to insert the heartbeat signal into data packets. A third terminal is coupled to the heartbeat insert circuit and adapted to couple the tap to a network monitor and communicate data packets with network monitor. A heartbeat remove circuit is coupled to the third terminal and configured to receive data packets from a network monitor and remove the heartbeat signal from the data packets. A heartbeat detector coupled to the heartbeat remove circuit and configured to detect whether the data packets include the heartbeat signal, and if not, to generate an alarm signal. A switch is coupled to the second terminal and configured to transmit data packets onto the network.

In one aspect of the invention, a switch is coupled to the first terminal and the second terminal and the heartbeat insert circuit and the heartbeat removal circuit and configured to selectively direct data packets.

In another aspect of the invention, a switch is coupled to the first terminal and the second terminal and configured to provide a copy of the data packets to a fourth terminal.

Advantages of the invention include ensuring the integrity of network monitoring equipment.

DESCRIPTION OF THE DRAWINGS

The foregoing and other features, aspects, and advantages will become more apparent from the following detailed description when read in conjunction with the following drawings, wherein.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to Ethernet Protocol but other protocols can be used in the invention. Likewise, reference is made to network traffic and packets, while other forms of data and addresses can be used in the invention. The invention is applicable to both wire and optical technologies.

Figure 1:
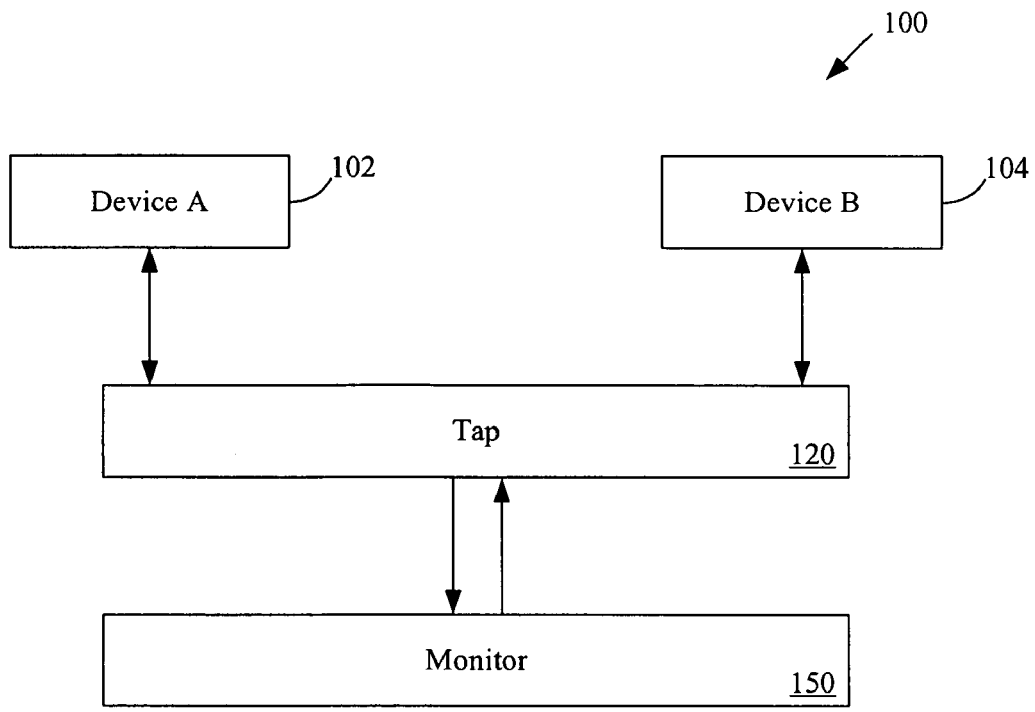
FIG. 1 depicts a network tap in a communications network according to an embodiment of the invention.

FIG. 1 depicts a communications network 100 including a plurality of network devices 102 and 104. These network devices are, for example, a switch and a router, but can also represent other types of network devices, server computers, client computers and so forth. A network tap 120 is disposed in-line between the network devices 102, 104 and is configured to communicate bi-directionally with each of the devices. The network tap is also coupled to a network monitor 150, which can be an intrusion detection device (IDS), intrusion prevention device (IPS) or other type of monitor.

Figure 2:
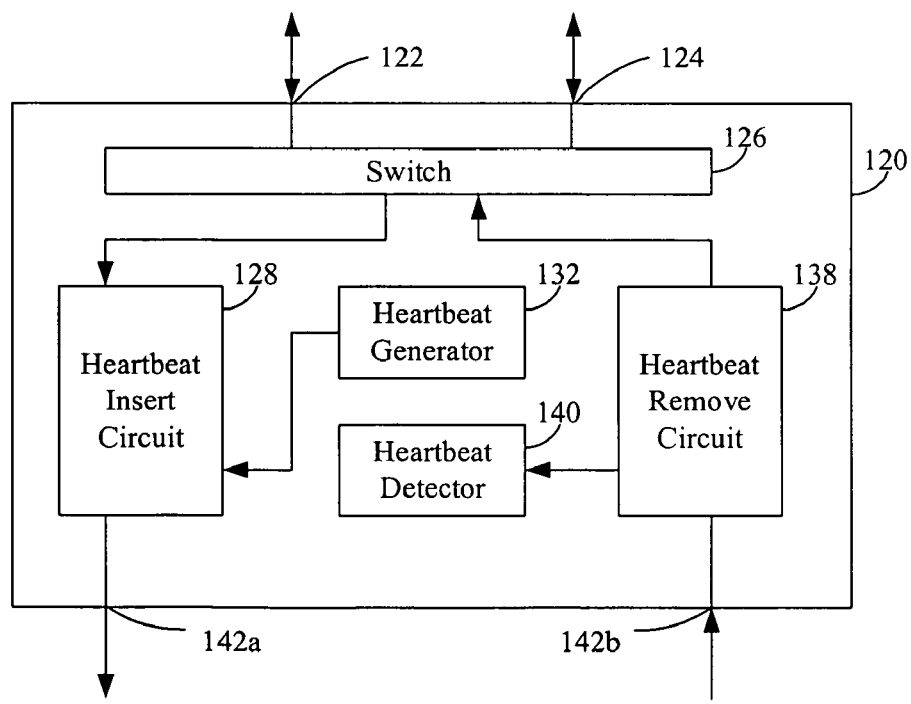
FIG. 2 depicts a network tap according to an embodiment of the invention.

FIG. 2 depicts a block diagram of the network tap 120 according to an embodiment of the invention. The network tap includes a heartbeat generator and monitor for ensuring the integrity of a network monitor and network traffic. The invention inserts a heartbeat signal into the network traffic prior to a network monitor and then verifies for the heartbeat signal prior to returning the data traffic back into the communication network.

The exemplary embodiment comprises a first terminal 122 and a second terminal 124 adapted to couple the tap in-line in the network and communicate data packets with the network devices 102 and 104. A switch 126 directs received data packets from the devices to a heartbeat insert circuit. A heartbeat generator 132 is configured to generate a heartbeat signal to communicate the heartbeat signal to the heartbeat insert circuit. The heartbeat insert circuit is configured to insert the heartbeat signal into the data packets. A third terminal 142, 144 is coupled to the heartbeat insert circuit and adapted to couple the tap to the network monitor 150 and communicate data packets with network monitor, which data packets are returned via terminal 144. Terminals 142a-142b are collectively referred to at the third terminal 142 since a terminal can constitute one or more physical terminals, which can constitute one or more wires or optical fibers. A heartbeat remove circuit 138 is coupled to the third terminal and configured to receive data packets from the network monitor and remove the heartbeat signal from the data packets. A heartbeat detector 140 is coupled to the heartbeat remove circuit and configured to detect whether the data packets include the heartbeat signal. If the heartbeat monitor does not detect the heartbeat signal, it generates an alarm signal. The switch 120 performs a bypass on receipt of the alarm signal to ensure continued communication in event of the monitor failure.

The embodiment shown in FIG. 2 is applicable to both wire and optical communication technology. In the event that optical transport is employed, the optical signal is directed through the switch 126 to the heartbeat insert circuit 128. Circuit 128 preferably includes an optical to electronic converter, or optoelectronic switch, to convert the optical signals into electronic signals. Then the heartbeat signal can be inserted into the data packets in the electronic domain to ensure the smooth insertion of the heartbeat signal into the data packets. Heartbeat remove circuit 138 includes a circuit to return the signal from the electronic domain to the optical domain for communication to the switch 126 and destination device.

Figure 3A:
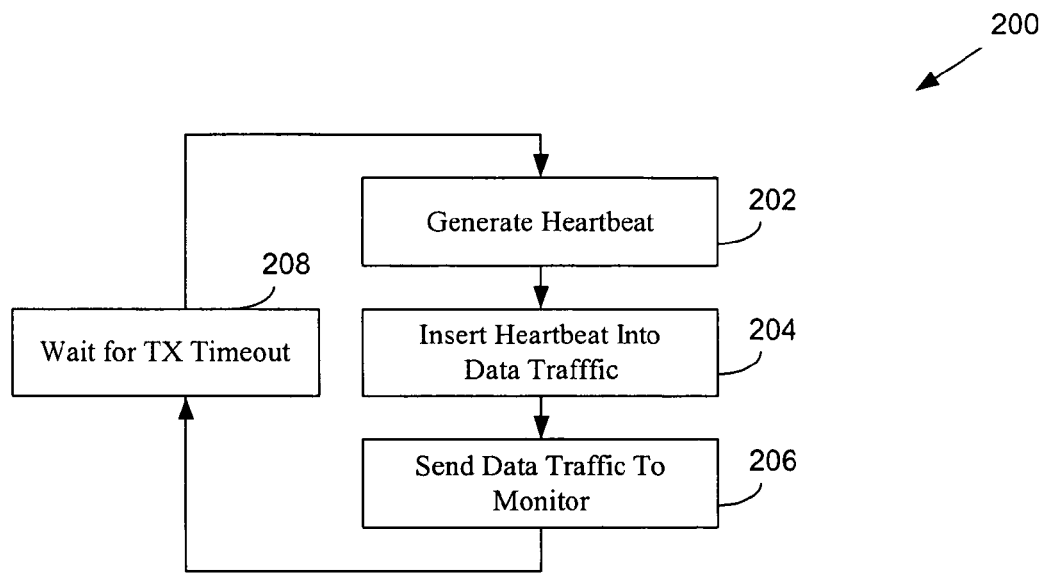
FIGS. 3A-B are flowcharts showing methods according to embodiments of the invention.
Figure 3B:
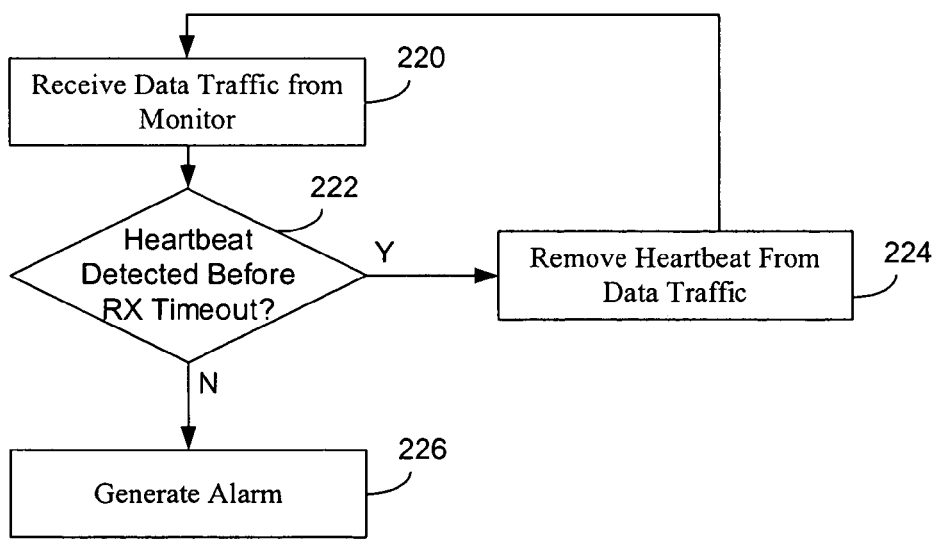

FIGS. 3A-B depicts a flowchart 200 showing methods according to embodiments of the invention. Step 202 generates a heartbeat signal and step 204 inserts the heartbeat signal into data packets. Step 206 forwards the packets with the heartbeat signal to the network monitor. Since the heartbeat signal is periodically inserted into the data traffic, step 208 provides a timer that returns the method to step 202 after a predetermined timeout period.

Step 220 receives the data packets from the network monitor. Step 222 determines whether the heartbeat signal is present within a predetermined time interval or timeout. If the heartbeat signal is present, the method continues to step 224 which removes the heartbeat signal from the data packets. If the heartbeat signal is not present, step 226 generates an alarm signal. The alarm signal can perform one or more actions, for example, to turn on an error light on the tap, to send a failure packet to a specific network device at a particular IP address, or other such action. On viewing or receiving the alarm signal, a network administrator can diagnose the situation and remedy the error.

Figure 4:
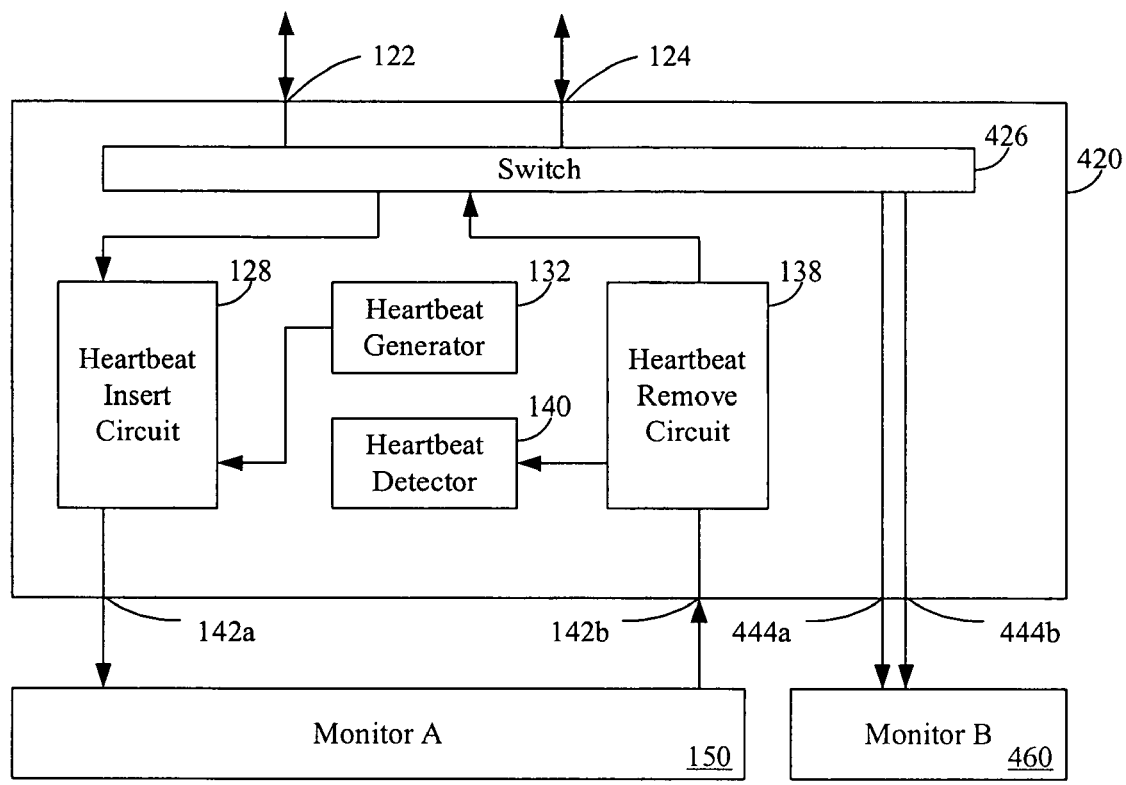
FIG. 4 depicts a network tap in a communications network according to an embodiment of the invention.

FIG. 4 depicts a network tap in a communications network according to an embodiment of the invention. In this embodiment, the tap includes a switch 420 that is modified to provide a dedicated monitor port via terminal 444 for a second monitor. Terminal 444 is referred to as the fourth terminal and includes terminals 444a and 444b, which provide traffic both from Device A to Device B, and from Device B to Device A. Examples of the types of monitors are an in-band monitor or protocol analyzer. In this embodiment, Monitor A 150 can provide an active monitor function, which Monitor B 460 can provide a passive monitor function. If the network is a wire network, switch 420 provides a copy of the network traffic to the second monitor terminal 444. If the network is an optical network, then switch 420 includes an optical splitter and provides the directional traffic to the terminal 444 for the monitor to receive the optical traffic.

Advantages of the invention include ensuring the integrity of network monitoring equipment.

Having disclosed exemplary embodiments and the best mode, modifications and variations may be made to the disclosed embodiments while remaining within the subject and spirit of the invention as defined by the following claims.

The invention claimed is:

1. A network tap for detecting a fault in a network component, the network tap comprising:
   a heartbeat generator for generating a heartbeat signal;
   a heartbeat insert circuit for receiving a first set of data, inserting the heartbeat signal into the first set of data, and providing the first set of data, with the heartbeat signal inserted, to the network component;
   a heartbeat remove circuit for receiving a second set of data from the network component and, if the second set of data includes the heartbeat signal, removing the heartbeat signal from the second set of data; and
   a heartbeat detector for detecting the heartbeat signal and, if the heartbeat signal is not detected, generating an alarm signal, the heartbeat detector being coupled to the heartbeat remove circuit.

2. The network tap of claim 1 wherein the network component includes at least one of a network monitor, a switch, a router, a server computer, and a client computer.

3. The network tap of claim 1 wherein the heartbeat signal is inserted periodically.

4. The network tap of claim 1 where the heartbeat detector generates the alarm signal if the heartbeat signal is not detected within a predetermined time interval or by a predetermined time.

5. The network tap of claim 1 further comprising a switch coupled to at least one of the heartbeat insert circuit and the heartbeat remove circuit the switch being configured to perform at least one of receiving and transmitting one or more of the first set of data, the second set of data, and the second set of data less the heartbeat signal.

6. The network tap of claim 1 further comprising a switch configured to, on receipt of the alarm signal, perform a bypass of data traffic.

7. The network tap of claim 1 further comprising a switch configured to provide a copy of the first set of data to a second network component.

8. The network tap of claim 1 further comprising a converter configured to convert optical signals pertaining to the first set of data into electronic signals before the heartbeat signal is inserted.

9. The network tap of claim 1 further comprising a converter configured to convert electronic signals pertaining to at least one of the second set of data and the second set of data less the heartbeat signal into optical signals.

10. The network tap of claim 1 wherein the network component represents at least one of an intrusion detection device, an intrusion prevention device, an in-band monitor, and a protocol analyzer.

11. A method for detecting a fault in a network component, the method comprising:
   generating a heartbeat signal;
   receiving a first set of data;
   inserting the heartbeat signal into the first set of data;
   providing the first set of data, with the heartbeat signal inserted, to the network component;
   receiving a second set of data from the network component;
   detecting whether the second set of data includes the heartbeat signal;
   generating an alarm signal if the heartbeat signal is not detected; and
   removing the heartbeat signal from the second set of data if the second set of data includes the heartbeat signal 12. The method of claim 11 wherein the network component includes at least one of a network monitor, a switch, a router, a server computer, and a client computer.

13. The method of claim 11 further comprising periodically inserting the heartbeat signal.

14. The method of claim 11 where the alarm signal is generated if the heartbeat signal is not detected within a predetermined time interval or by a predetermined time.

15. The method of claim 11 further comprising transmitting at least one of the second set of data and the second set of data less the heartbeat signal to a network device other than the network component.

16. The method of claim 11 further comprising performing a bypass of data traffic after the alarm signal is generated.

17. The method of claim 11 further comprising providing a copy of the first set of data to a second network component.

18. The method of claim 11 further comprising converting optical signals pertaining to the first set of data into electronic signals before the heartbeat signal is inserted.

19. The method of claim 11 further comprising converting electronic signals pertaining to at least one of the second set of data and the second set of data less the heartbeat signal into optical signals.

20. The method of claim 11 wherein the network component represents at least one of an intrusion detection device, an intrusion prevention device, an in-band monitor, and a protocol analyzer.

* * * * *